(12) United States Patent
Jojima et al.

(10) Patent No.: US 9,951,973 B2
(45) Date of Patent: Apr. 24, 2018

(54) COOLING SYSTEM UTILIZING A PORTION OF THE LIQUID REFRIGERANT FROM THE CONDENSER

(75) Inventors: Yuki Jojima, Nagoya (JP); Yoshiaki Kawakami, Nagoya (JP); Eizo Takahashi, Chiryu (JP); Kousuke Sato, Toyota (JP); Yuichi Ohno, Nishio (JP); Kazuhide Uchida, Hamamatsu (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 749 days.

(21) Appl. No.: 14/241,268

(22) PCT Filed: Aug. 30, 2012

(86) PCT No.: PCT/IB2012/001676
§ 371 (c)(1),
(2), (4) Date: May 5, 2014

(87) PCT Pub. No.: WO2013/030657
PCT Pub. Date: Jul. 3, 2013

(65) Prior Publication Data
US 2015/0000331 A1     Jan. 1, 2015

(30) Foreign Application Priority Data
Aug. 31, 2011   (JP) .................................. 2011-188837

(51) Int. Cl.
*F25D 11/00*        (2006.01)
*F25B 39/04*        (2006.01)
(Continued)

(52) U.S. Cl.
CPC ......... *F25B 1/005* (2013.01); *B60H 1/00278* (2013.01); *B60H 1/143* (2013.01);
(Continued)

(58) Field of Classification Search
CPC .. F25D 11/006; F25B 2400/24; F25B 43/006; F25B 2400/16; F25B 2400/23;
(Continued)

(56) References Cited

U.S. PATENT DOCUMENTS 2,795,374 A * 6/1957 Isakoff ................ F04B 39/0055
138/26
3,095,012 A * 6/1963 McShane ................. G21C 1/09
137/339
(Continued)

FOREIGN PATENT DOCUMENTS

JP         11034640 A     2/1999
JP        2000-073763  *  3/2000
(Continued)

*Primary Examiner* — Frantz Jules
*Assistant Examiner* — Filip Zec
(74) *Attorney, Agent, or Firm* — Sughrue Mion, PLLC

(57) ABSTRACT

A cooling system (1) that cools an HV apparatus (31) includes a compressor (12) that circulates a refrigerant, a heat exchanger (14) that performs heat exchange between the refrigerant and outside air, an expansion valve (16) that reduces the pressure of the refrigerant, a heat exchanger (18) that performs heat exchange between the refrigerant and air-conditioning air, a cooling portion (30) that cools the HV apparatus (31) using the refrigerant that flows between the heat exchanger (14) and the expansion valve (16), and a gas accumulator (70) that retains a gas-phase refrigerant gasified by heat exchange with the HV apparatus (31) in the cooling portion (30).

9 Claims, 5 Drawing Sheets

(51) Int. Cl.
  *F25B 1/00* (2006.01)
  *B60H 1/00* (2006.01)
  *B60H 1/14* (2006.01)
  *B60H 1/32* (2006.01)
  *F25B 41/04* (2006.01)

(52) U.S. Cl.
  CPC ............. *B60H 1/323* (2013.01); *F25B 41/04* (2013.01); *B60H 2001/00307* (2013.01); *B60H 2001/3288* (2013.01)

(58) Field of Classification Search
  CPC ..... F16L 55/04; B60H 1/00278; B60H 1/143; B60H 1/323; B60H 2001/00307; B60H 2001/3288; F15B 2201/00; F15B 55/04
  USPC ....................... 62/437, 509; 138/30
  See application file for complete search history.

(56) References Cited

U.S. PATENT DOCUMENTS

| | | | | |
|---|---|---|---|---|
| 3,594,131 A | * | 7/1971 | De Palma et al. | B01D 53/944 422/176 |
| 3,838,977 A | * | 10/1974 | Warren | F01N 3/2846 210/351 |
| 3,905,459 A | * | 9/1975 | Liebich | B63H 23/08 138/30 |
| 3,987,708 A | * | 10/1976 | Uhrich | B63C 11/52 138/31 |
| 4,562,036 A | * | 12/1985 | Shin | F16L 55/05 138/30 |
| 4,997,009 A | * | 3/1991 | Niikura | B60G 17/0424 138/30 |
| 6,047,770 A | | 4/2000 | Suzuki et al. | |
| 6,164,086 A | * | 12/2000 | Kita | F25B 9/006 62/175 |
| 7,316,120 B2 | * | 1/2008 | Aoki | F25B 40/00 62/324.4 |
| 2004/0103677 A1 | | 6/2004 | Hirota | |
| 2010/0293966 A1 | | 11/2010 | Yokomachi et al. | |

FOREIGN PATENT DOCUMENTS

| | | |
|---|---|---|
| JP | 2003-285633 A | 10/2003 |
| JP | 2004183957 A | 7/2004 |
| JP | 2005-090862 A | 4/2005 |
| JP | 2006029614 A | 2/2006 |
| JP | 2007-069733 A | 3/2007 |
| JP | 2011-001048 A | 1/2011 |

* cited by examiner

COOLING SYSTEM UTILIZING A PORTION OF THE LIQUID REFRIGERANT FROM THE CONDENSER

BACKGROUND OF THE INVENTION

1. Field of the Invention

The invention relates to a cooling system, and more particularly, to a cooling system that cools a heat generation source using a vapor compression refrigeration cycle.

2. Description of Related Art

As a measure against environmental issues, hybrid vehicles, fuel cell vehicles, electric vehicles and the like, which run by a driving force of a motor, have been drawing attention. In each of such vehicles, electric apparatuses such as a motor, a generator, an inverter, a converter, a battery and the like generate heat by giving/receiving electric power. Therefore, these electric apparatuses need to be cooled. Thus, there has been proposed an art of cooling a heating element using a vapor compression refrigeration cycle that is employed as a vehicular air conditioner.

For example in Japanese Patent Application Publication No. 2007-69733 (JP-2007-69733 A), there is described a system that cools a heating element using a refrigerant for an air conditioner. In this system, a heat exchanger that exchanges heat with air-conditioning air, and a heat exchanger that exchanges heat with the heating element are arranged in parallel with each other in a refrigerant passage that extends from an expansion valve to a compressor. Further, in Japanese Patent Application Publication No. 2005-90862 (JP-2005-90862 A), there is described a cooling system. In this cooling system, heating element cooling means for cooling a heating element is provided in a bypass passage that bypasses a compressor, an evaporator, and a pressure reducer of an air-conditioning refrigeration cycle.

On the other hand, with regard to a vehicular air-conditioning system, in Japanese Patent Application Publication No. 2003-285633 (JP-2003-285633 A), there is described a device that causes a refrigerant to pass through a cold storage heat exchanger having a cooling storage material during the operation of a compressor, and cools the refrigerant by stored cold energy of the cooling storage material to operate an air conditioner after the stoppage of the compressor. In Japanese Patent Application Publication No. 2011-1048 (JP-2011-1048 A), there is described a vehicular air-conditioning system. In this vehicular air-conditioning system, a heat storage medium of an in-vehicle heat storage unit stores a quantity of heat, and the in-vehicle heat storage unit exchanges the quantity of heat with a heat exchange medium.

In the cooling system described in each of Japanese Patent Application Publication No. 2007-69733 (JP-2007-69733 A) and Japanese Patent Application Publication No. 2005-90862 (JP-2005-90862 A), a cooling path for cooling a heat generation source such as an electric apparatus or the like is incorporated in a vapor compression refrigeration cycle. When the heat generation source is cooled, the refrigerant in a two-phase state, namely, a gas-liquid phase state is introduced into a refrigerant path for cooling the heat generation source after having passed through a pressure reducer. When the flow rate of the refrigerant for cooling the heat generation source decreases, the performance of cooling the heat generation source may deteriorate.

SUMMARY OF THE INVENTION

The invention provides a cooling system that can stably cool a heat generation source.

A first aspect of the invention relates to a cooling system that cools a heat generation source. The cooling system includes a compressor that circulates a refrigerant, a first heat exchanger that performs heat exchange between the refrigerant and outside air, a pressure reducer that reduces a pressure of the refrigerant, a second heat exchanger that performs heat exchange between the refrigerant and air-conditioning air, a cooling portion that cools the heat generation source using the refrigerant that flows between the first heat exchanger and the pressure reducer, and a gas accumulator that retains a gas-phase refrigerant gasified by heat exchange with the heat generation source in the cooling portion.

In the foregoing aspect of the invention, the gas-phase refrigerant may flow into the gas accumulator and may be retained in the gas accumulator during the operation of the compressor, and may flow out from the gas accumulator during the stoppage of the compressor.

The aforementioned cooling system may further include a discharge portion that forcibly discharges the gas-phase refrigerant from the gas accumulator.

The aforementioned cooling system may further include a check valve that prohibits the gas-phase refrigerant that flows out from the gas accumulator from flowing to the cooling portion.

In the foregoing aspect of the invention, the gas accumulator may include a movable partition portion that divides an inner space of the gas accumulator into a vapor accommodation portion in which the gas-phase refrigerant is accommodated, and a gas encapsulation portion in which a gas is encapsulated.

In the foregoing aspect of the invention, the gas accumulator may include a sealing material that is arranged on a peripheral edge portion of a surface of the movable partition portion, the surface facing the vapor accommodation portion.

The aforementioned cooling system may further include a first passage and a second passage that are connected in parallel with each other in a route of the refrigerant between the first heat exchanger and the pressure reducer. The heat generation source may be cooled by the refrigerant that flows through the second passage.

The aforementioned cooling system may further include a third passage through which the refrigerant flows between the compressor and the first heat exchanger, and a communication channel that establishes communication between the third passage and a side of the second passage, the side being located closer to the pressure reducer than the cooling portion.

The aforementioned cooling system may further include a changeover valve that changes a communication state between the communication channel and the side of the second passage, the side being located closer to the pressure reducer than the cooling portion.

In the foregoing aspect of the invention, the changeover valve may cause the refrigerant to flow to the communication channel during the stoppage of the compressor.

According to the cooling system of the invention, the cooling capacity to cool the heat generation source is restrained from decreasing, and the heat generation source is stably cooled.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
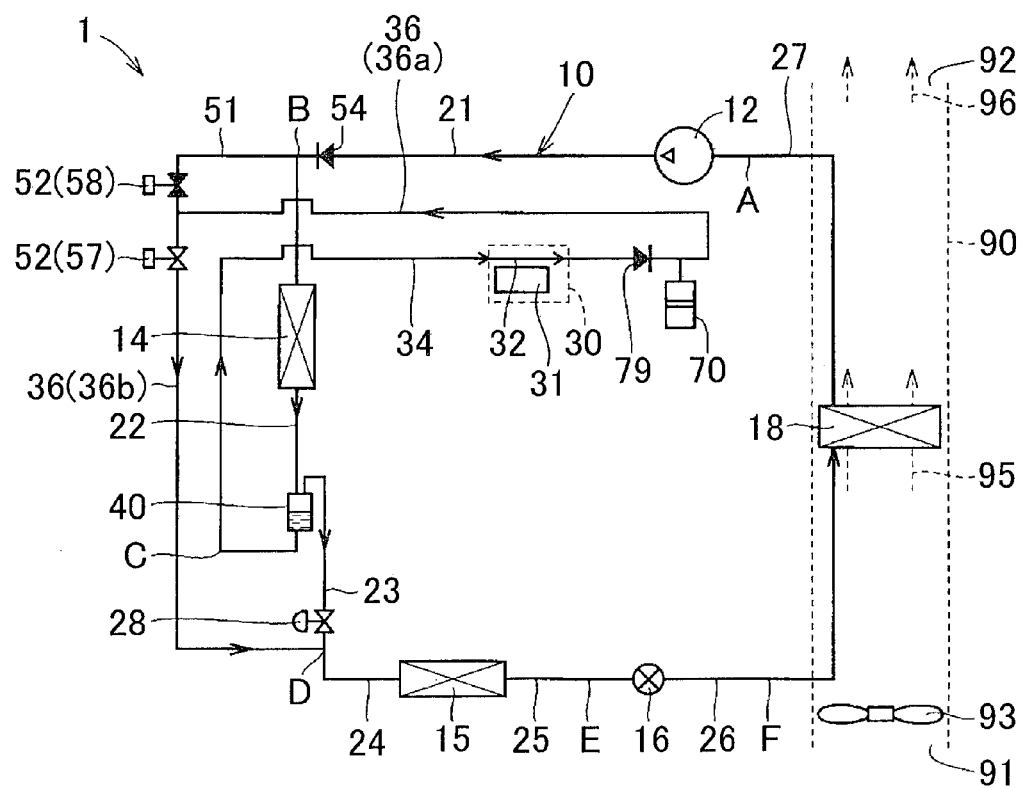
FIG. 1 is a schematic view showing the configuration of a cooling system according to a first embodiment of the invention.

Hereinafter, embodiments of this invention will be described on the basis of the drawings. It should be noted that like or equivalent components are denoted by like reference numerals in the following drawings, and that the same description of those components will not be repeated.

First Embodiment

FIG. 1 is a schematic view showing the configuration of a cooling system 1 according to a first embodiment of the invention. As shown in FIG. 1, the cooling system 1 includes a vapor compression refrigeration cycle 10. The vapor compression refrigeration cycle 10 is mounted on a vehicle so as to, for example, cool the interior of a cabin of the vehicle. The interior of the cabin is cooled through the use of the vapor compression refrigeration cycle 10, for example, when a switch for cooling is turned on, or when an automatic control mode for automatically adjusting the temperature in the cabin of the vehicle to a set temperature is selected and the temperature in the cabin is higher than the set temperature.

The vapor compression refrigeration cycle 10 includes a compressor 12, a heat exchanger 14 as a first heat exchanger, a heat exchanger 15, an expansion valve 16 as an example of a pressure reducer, and a heat exchanger 18 as a second heat exchanger.

The compressor 12 operates using as a power source a motor or engine mounted on the vehicle, and adiabatically compresses a refrigerant gas to obtain an overheated refrigerant gas. The compressor 12 sucks and compresses the refrigerant flowing therethrough from the heat exchanger 18 during the operation of the vapor compression refrigeration cycle 10, and discharges a high-temperature, high-pressure gas-phase refrigerant to a refrigerant passage 21. The compressor 12 discharges the refrigerant to the refrigerant passage 21, and thereby causes the refrigerant to circulate through the vapor compression refrigeration cycle 10.

The heat exchangers 14 and 15 isobarically radiate heat of the overheated refrigerant gas compressed by the compressor 12 to an external medium to obtain a refrigerant liquid. The high-pressure gas-phase refrigerant discharged from the compressor 12 radiates heat around the heat exchangers 14 and 15, and is cooled to condense (liquefy). Each of the heat exchangers 14 and 15 includes a tube through which the refrigerant is caused to flow, and a fin for exchanging heat between the refrigerant flowing through the tube and air around a corresponding one of the heat exchangers 14 and 15. The heat exchangers 14 and 15 exchange heat between the refrigerant and a cooling wind that is supplied through natural ventilation caused by the running of the vehicle or forcible ventilation from a cooling fan such as a radiator fan for cooling an engine or the like. Due to the heat exchange in the heat exchangers 14 and 15, the temperature of the refrigerant falls, and the refrigerant liquefies.

The expansion valve 16 expands the high-pressure liquid-phase refrigerant flowing through a refrigerant passage 25 by injecting it from a small hole. Thus, the expansion valve 16 changes the high-pressure liquid-phase refrigerant into a low-temperature, low-pressure misty refrigerant. The expansion valve 16 reduces the pressure of the refrigerant liquid condensed by the heat exchangers 14 and 15 to obtain wet vapors in a gas-liquid mixed state. It should be noted that the pressure reducer for reducing the pressure of the refrigerant liquid is not limited to the expansion valve 16 that expands in a throttling manner, but may be a capillary tube.

The misty refrigerant flowing through the heat exchanger 18 gasifies. The heat exchanger 18 thereby absorbs the heat of ambient air that has been so introduced as to come into contact with the heat exchanger 18. Using the refrigerant whose pressure has been reduced by the expansion valve 16, the heat exchanger 18 absorbs, from air-conditioning air flowing into the cabin of the vehicle, vaporization heat that is required when the wet vapors of the refrigerant vaporize to become the refrigerant gas, thereby cooling the interior of the cabin of the vehicle. The air-conditioning air whose temperature has fallen through the absorption of the heat by the heat exchanger 18 is returned to the interior of the cabin again, so that the interior of the cabin of the vehicle is cooled. The refrigerant absorbs heat from around the heat exchanger 18, and is heated.

The heat exchanger 18 includes a tube through which the refrigerant is caused to flow, and a fin for exchanging heat between the refrigerant flowing through the tube and air around the heat exchanger 18. The refrigerant in a wet vapor state flows through the tube. In flowing through the tube, the refrigerant vaporizes by absorbing the heat of air in the cabin of the vehicle as evaporative latent heat via the fin, and then becomes overheated vapors due to sensible heat. The gasified refrigerant flows into the compressor 12 via a refrigerant passage 27. The compressor 12 compresses the refrigerant flowing therethrough from the heat exchanger 18.

The vapor compression refrigeration cycle 10 further includes the refrigerant passage 21 as a third passage through which the compressor 12 and the heat exchanger 14 communicate with each other, refrigerant passages 22, 23, and 24 through which the heat exchanger 14 and the heat exchanger 15 communicate with each other, the refrigerant passage 25 through which the heat exchanger 15 and the expansion valve 16 communicate with each other, a refrigerant passage 26 through which the expansion valve 16 and the heat exchanger 18 communicate with each other, and the refrigerant passage 27 through which the heat exchanger 18 and the compressor 12 communicate with each other.

The refrigerant passage 21 is a passage through which the refrigerant flows from the compressor 12 into the heat exchanger 14. The refrigerant flows from an outlet of the compressor 12 toward an inlet of the heat exchanger 14, between the compressor 12 and the heat exchanger 14, via the refrigerant passage 21. The refrigerant passages 22 to 25 are passages through which the refrigerant flows from the heat exchanger 14 into the expansion valve 16. The refrigerant flows from an outlet of the heat exchanger 14 toward an inlet of the expansion valve 16, between the heat exchanger 14 and the expansion valve 16, via the refrigerant passages 22 to 25.

The refrigerant passage 26 is a passage through which the refrigerant flows from the expansion valve 16 into the heat exchanger 18. The refrigerant flows from an outlet of the expansion valve 16 toward an inlet of the heat exchanger 18, between the expansion valve 16 and the heat exchanger 18, via the refrigerant passage 26. The refrigerant passage 27 is a passage through which the refrigerant flows from the heat exchanger 18 into the compressor 12. The refrigerant flows from an outlet of the heat exchanger 18 toward an inlet of the compressor 12, between the heat exchanger 18 and the compressor 12, via the refrigerant passage 27.

The vapor compression refrigeration cycle 10 is constituted by coupling the compressor 12, the heat exchangers 14 and 15, the expansion valve 16, and the heat exchanger 18 to one another via the refrigerant passages 21 to 27. It should be noted that, for example, carbon dioxide, a hydrocarbon such as propane, isobutane or the like, ammonia, water or the like can be used as the refrigerant for the vapor compression refrigeration cycle 10.

The vapor compression refrigeration cycle 10 further includes a gas-liquid separator 40 arranged on a route of the refrigerant that flows between the heat exchanger 14 and the expansion valve 16. The gas-liquid separator 40 separates the refrigerant that flows out from the heat exchanger 14 into the gas-phase refrigerant and the liquid-phase refrigerant. A refrigerant liquid as the liquid-phase refrigerant and refrigerant vapors as the gas-phase refrigerant are stored inside the gas-liquid separator 40. The refrigerant passages 22 and 23 and the refrigerant passage 34 are coupled to the gas-liquid separator 40.

The refrigerant assumes a state of wet vapors in a gas-liquid two-phase state as a mixture of a saturated liquid and saturated vapors on the outlet side of the heat exchanger 14. The refrigerant that has flowed out from the heat exchanger 14 is supplied to the gas-liquid separator 40 through the refrigerant passage 22. The refrigerant in the gas-liquid two-phase state, which flows from the refrigerant passage 22 into the gas-liquid separator 40, is separated into a gas phase and a liquid phase inside the gas-liquid separator 40. The gas-liquid separator 40 separates the refrigerant condensed by the heat exchanger 14 into the refrigerant liquid in a liquid state and the refrigerant vapors in a gaseous state, and temporarily stores them.

The separated refrigerant liquid flows out to the outside of the gas-liquid separator 40 via the refrigerant passage 34. An end of the refrigerant passage 34 arranged in the liquid phase in the gas-liquid separator 40 forms a flow outlet through which the liquid-phase refrigerant flows out from the gas-liquid separator 40. The separated refrigerant vapors flow out to the outside of the gas-liquid separator 40 via the refrigerant passage 23. An end of the refrigerant passage 23 that is arranged in the gas phase in the gas-liquid separator 40 forms a flow outlet through which the gas-phase refrigerant flows out from the gas-liquid separator 40. The gas-phase refrigerant vapors derived from the gas-liquid separator 40 radiate heat around the heat exchanger 15 as a third heat exchanger, and are cooled to condense.

The refrigerant liquid accumulates in a lower region of the gas-liquid separator 40, and the refrigerant vapors accumulate in an upper region of the gas-liquid separator 40. An end of the refrigerant passage 34 through which the refrigerant liquid is derived from the gas-liquid separator 40 is coupled to a bottom portion of the gas-liquid separator 40. Only the refrigerant liquid is delivered to the outside of the gas-liquid separator 40 from the bottom side of the gas-liquid separator 40 via the refrigerant passage 34. An end of the refrigerant passage 23 through which the refrigerant vapors are derived from the gas-liquid separator 40 is coupled to a ceiling portion of the gas-liquid separator 40. Only the refrigerant vapors are delivered to the outside of the gas-liquid separator 40 from the ceiling side of the gas-liquid separator 40 via the refrigerant passage 23. Due to the delivered refrigerant vapors, the gas-liquid separator 40 can reliably separate the gas-phase refrigerant and the liquid-phase refrigerant from each other.

The route through which the refrigerant flows from the outlet of the heat exchanger 14 toward the inlet of the expansion valve 16 includes the refrigerant passage 22 that extends from the outlet side of the heat exchanger 14 to the gas-liquid separator 40, the refrigerant passage 23 through which the refrigerant vapors are caused to flow out from the gas-liquid separator 40 and which extends via a later-described flow rate adjusting valve 28, the refrigerant passage 24 coupled to the inlet side of the heat exchanger 15, and the refrigerant passage 25 through which the refrigerant is caused to flow from the outlet side of the heat exchanger 15 to the expansion valve 16. The gas-phase refrigerant separated by the gas-liquid separator 40 flows through the refrigerant passage 23 as the first passage.

The route through which the refrigerant flows between the heat exchanger 14 and the heat exchanger 15 further includes the refrigerant passage 34 through which the gas-liquid separator 40 and a cooling portion 30 communicate with each other, and a refrigerant passage 36 through which the cooling portion 30 and the refrigerant passage 24 communicate with each other. The refrigerant liquid flows from the gas-liquid separator 40 into the cooling portion 30 via the refrigerant passage 34. The refrigerant that has passed through the cooling portion 30 returns to the refrigerant passage 24 via the refrigerant passage 36. The liquid-phase refrigerant separated by the gas-liquid separator 40 flows through the refrigerant passages 34 and 36 as the second passage. Within the first passage (the refrigerant passage 23) and the second passage (the refrigerant passages 34 and 36) that are connected in parallel with each other on the route through which the refrigerant flows from the heat exchanger 14 toward the heat exchanger 15 between the gas-liquid separator 40 and the expansion valve 16, the cooling portion 30 is provided on the second passage.

A point D shown in FIG. 1 indicates a coupling point of the refrigerant passage 23, the refrigerant passage 24, and the refrigerant passage 36. That is, the point D indicates a downstream end of the refrigerant passage 23 (i.e., an end in a side closer to the heat exchanger 15), an upstream end of the refrigerant passage 24 (i.e., an end in a side closer to the heat exchanger 14), and a downstream end of the refrigerant passage 36. The refrigerant passage 23 forms a part of the route through which the refrigerant flows from the gas-liquid separator 40 toward the expansion valve 16. This part extends from the gas-liquid separator 40 to the point D.

The cooling system 1 includes a refrigerant route arranged in parallel with the refrigerant passage 23, and the cooling portion 30 is provided on the refrigerant route. The cooling portion 30 includes a hybrid vehicle (HV) apparatus 31 as an electric apparatus mounted on the vehicle, and a cooling passage 32 as a pipeline through which the refrigerant flows. The HV apparatus 31 is an example of a heat generation source. One end of the cooling passage 32 is connected to the refrigerant passage 34. The other end of the cooling passage 32 is connected to the refrigerant passage 36.

The refrigerant route that is connected in parallel with the refrigerant passage 23 between the gas-liquid separator 40 and the point D shown in FIG. 1 includes the refrigerant passage 34 which is located on the upstream side (side closer to the gas-liquid separator 40) of the cooling portion 30, the cooling passage 32 included in the cooling portion 30, and the refrigerant passage 36 which is located on the downstream side (side closer to the heat exchanger 15) of the cooling portion 30. The refrigerant passage 34 is a passage through which the liquid-phase refrigerant flows from the gas-liquid separator 40 into the cooling portion 30. The refrigerant passage 36 is a passage through which the refrigerant flows from the cooling portion 30 to the point D. The point D is a branching point between the refrigerant passages 23 and 24 and the refrigerant passage 36.

The refrigerant liquid that has flowed out from the gas-liquid separator 40 flows toward the cooling portion 30 via the refrigerant passage 34. The refrigerant that flows into the cooling portion 30 and via the cooling passage 32 removes heat from the HV apparatus 31 as a heat generation source, and cools the HV apparatus 31. The cooling portion 30 cools the HV apparatus 31, using the liquid-phase refrigerant that is separated in the gas-liquid separator 40 and flows to the cooling passage 32 via the refrigerant passage 34. In the cooling portion 30, the refrigerant flowing through the cooling passage 32 and the HV apparatus 31 exchange heat with each other. As a result, the HV apparatus 31 is cooled, and the refrigerant is heated. In addition, the refrigerant flows from the cooling portion 30 toward the point D via the refrigerant passage 36, and reaches the heat exchanger 15 via the refrigerant passage 24.

The cooling portion 30 is so provided as to have a structure that allows heat exchange between the HV apparatus 31 and the refrigerant in the cooling passage 32. In this embodiment of the invention, the cooling portion 30 has the cooling passage 32 that is formed, for example, such that an outer peripheral face of the cooling passage 32 is in direct contact with a case of the HV apparatus 31. The cooling passage 32 has a region that is adjacent to the case of the HV apparatus 31. In this region, the refrigerant flowing through the cooling passage 32 and the HV apparatus 31 can exchange heat with each other.

The HV apparatus 31 is directly connected to the outer peripheral face of the cooling passage 32, which forms a part of the refrigerant route extending from the heat exchanger 14 to the heat exchanger 15 in the vapor compression refrigeration cycle 10, and thus the HV apparatus 31 is cooled. The HV apparatus 31 is arranged outside the cooling passage 32, and hence does not interfere with the flow of the refrigerant that flows through in the cooling passage 32. For this reason, the pressure loss of the vapor compression refrigeration cycle 10 does not increase. Therefore, the HV apparatus 31 can be cooled without increasing the power of the compressor 12.

Alternatively, the cooling portion 30 may include an ordinary heat pipe that is so arranged as to be interposed between the HV apparatus 31 and the cooling passage 32. In this case, the HV apparatus 31 is connected to the outer peripheral face of the cooling passage 32 via the heat pipe, and is cooled through heat transfer from the HV apparatus 31 to the cooling passage 32 via the heat pipe. The heat transfer efficiency between the cooling passage 32 and the HV apparatus 31 is enhanced by using the HV apparatus 31 as a heating portion for the heat pipe and using the cooling passage 32 as a cooling portion for the heat pipe. Therefore, the efficiency of cooling the HV apparatus 31 can be enhanced. For example, a Wick heat pipe can be employed.

Heat can be reliably transferred from the HV apparatus 31 to the cooling passage 32 by the heat pipe. Therefore, there may be a certain distance between the HV apparatus 31 and the cooling passage 32. There is no need to arrange the cooling passage 32 in a complicated manner to bring the cooling passage 32 into contact with the HV apparatus 31. As a result, the degree of freedom in arranging the HV apparatus 31 can be enhanced.

The HV apparatus 31 includes an electric apparatus that generates heat by giving/receiving an electric power. The electric apparatus includes, for example, at least one of an inverter for converting a direct-current electric power into an alternating-current electric power, a motor-generator as a rotating electrical machine, a battery as an electrical storage device, a converter for stepping up the voltage of the battery, a DC/DC converter for stepping down the voltage of the battery, and the like. The battery is a secondary battery such as a lithium-ion battery, a nickel hydride battery, or the like. A capacitor may be employed instead of the battery.

The heat exchanger 18 is arranged inside a duct 90 through which air flows. The heat exchanger 18 performs heat exchange between the refrigerant and the air-conditioning air flowing through the duct 90, and hence adjusts the temperature of the air-conditioning air. The duct 90 has a duct inlet 91 as an inlet through which the air-conditioning air flows into the duct 90, and a duct outlet 92 as an outlet through which the air-conditioning air flows out from the duct 90. A fan 93 is arranged in the vicinity of the duct inlet 91 inside the duct 90.

Air flows through in the duct 90 through the driving of the fan 93. When the fan 93 operates, the air-conditioning air flows into the duct 90 via the duct inlet 91. The air that flows into the duct 90 may be outside air, or air in the cabin of the vehicle. Arrows 95 in FIG. 1 indicate the flow of the air-conditioning air that flows through via the heat exchanger 18 and exchanges heat with the refrigerant in the vapor compression refrigeration cycle 10. During cooling operation, the air-conditioning air is cooled in the heat exchanger 18, and the refrigerant is heated upon receiving the heat transferred from the air-conditioning air. Arrows 96 indicate the flow of the air-conditioning air whose temperature is adjusted by the heat exchanger 18 and which flows out from the duct 90 via the duct outlet 92.

The refrigerant circulates in the vapor compression refrigeration cycle 10 through a refrigerant circulation flow channel that is formed by sequentially connecting the compressor 12, the heat exchangers 14 and 15, the expansion valve 16, and the heat exchanger 18 by the refrigerant passages 21 to 27. The refrigerant flows past a point A, a point B, a point C, the point D, a point E, and a point F as shown in FIG. 1 in this order in the vapor compression refrigeration cycle 10. The refrigerant thereby circulates through the compressor 12, the heat exchangers 14 and 15, the expansion valve 16, and the heat exchanger 18.

Figure 2:
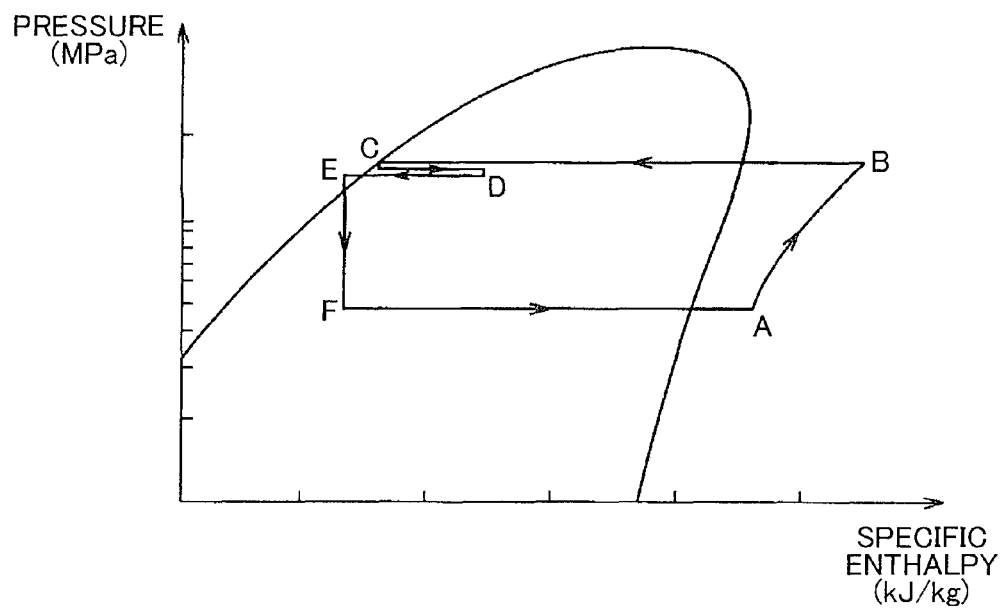
FIG. 2 is a Mollier chart showing the state of a refrigerant in a vapor compression refrigeration cycle.

FIG. 2 is a Mollier chart showing a state of the refrigerant in the vapor compression refrigeration cycle 10. The axis of abscissa in FIG. 2 represents a specific enthalpy (unit: kJ/kg) of the refrigerant, and the axis of ordinate in FIG. 2 represents an absolute pressure (unit: MPa) of the refrigerant. A curve in FIG. 2 indicates a saturated vapor curve of the refrigerant and a saturated liquid curve of the refrigerant. FIG. 2 shows thermodynamic states of the refrigerant that flows from the refrigerant passage 22 at the outlet of the heat exchanger 14 into the refrigerant passage 34 via the gas-liquid separator 40, cools the HV apparatus 31, and returns from the refrigerant passage 36 to the refrigerant passage 24 at the inlet of the heat exchanger 15 via the point D at the respective points (i.e., the points A, B, C, D, E, and F) in the vapor compression refrigeration cycle 10.

As shown in FIG. 2, the refrigerant in an overheated vapor state (at the point A), which has been sucked into the compressor 12, is adiabatically compressed along an iso-specific entropy line in the compressor 12. As the refrigerant is compressed, the pressure and temperature of the refrigerant rise. The refrigerant then becomes high-temperature, high-pressure overheated vapors with a high degree of overheat (at the point B), and flows to the heat exchanger 14. The gas-phase refrigerant discharged from the compressor 12 radiates heat around the heat exchanger 14, and is cooled to thereby condense (liquefy). Due to heat exchange with outside air in the heat exchanger 14, the temperature of the refrigerant falls, and the refrigerant liquefies. The high-pressure refrigerant vapors that have entered the heat exchanger 14 isobarically turn from overheated vapors to dry saturated vapors in the heat exchanger 14, radiate condensation latent heat, gradually liquefy, and become wet vapors in a gas-liquid mixed state. In the refrigerant in a gas-liquid two-phase state, the condensed refrigerant is in a saturated liquid state (at the point C).

The refrigerant is separated into the gas-phase refrigerant and the liquid-phase refrigerant in the gas-liquid separator 40. Within the refrigerant subjected to gas-liquid separation, the liquid-phase refrigerant liquid flows from the gas-liquid separator 40 to the cooling passage 32 of the cooling portion 30 via the refrigerant passage 34, and cools the HV apparatus 31. In the cooling portion 30, heat is radiated to the liquid refrigerant in a saturated liquid state, which has been condensed while passing through the heat exchanger 14, so that the HV apparatus 31 is cooled. Due to the heat exchange with the HV apparatus 31, the refrigerant is heated, and the degree of dryness of the refrigerant increases. The refrigerant receives latent heat from the HV apparatus 31, partially gasifies, and becomes wet vapors as a mixture of a saturated liquid and saturated vapors (at the point D).

After passing through the point D, the refrigerant flows into the heat exchanger 15. The wet vapors of the refrigerant exchange heat with outside air in the heat exchanger 15, and are cooled to be condensed again. When the entire refrigerant condenses, it becomes a saturated liquid. In addition, the refrigerant radiates sensible heat and becomes an overcooled liquid that has been overcooled (at the point E). After passing the point E, the refrigerant flows into the expansion valve 16 via the refrigerant passage 25. In the expansion valve 16, the refrigerant in an overcooled liquid state is expanded in a throttling manner. The specific enthalpy of the refrigerant does not change, but the temperature and pressure of the refrigerant fall. The refrigerant then becomes low-temperature, low-pressure wet vapors in a gas-liquid mixture state (at the point F).

The refrigerant in a wet vapor state, which has left the expansion valve 16, flows into the heat exchanger 18 via the refrigerant passage 26. The refrigerant in a wet vapor state flows into the tube of the heat exchanger 18. In flowing through in the tube of the heat exchanger 18, the refrigerant flows via the fin, absorbs the heat of air in the cabin of the vehicle as evaporative latent heat, and thereby evaporates isobarically. When the entire refrigerant becomes dry saturated vapors, the refrigerant vapors further rise in temperature due to sensible heat, and become overheated vapors (at the point A). After passing the point A, the refrigerant is sucked into the compressor 12 via the refrigerant passage 27. The compressor 12 compresses the refrigerant that flows therethrough from the heat exchanger 18.

In accordance with a cycle as described above, the state of the refrigerant continuously and repeatedly changes among the compressed state, the condensed state, the throttle-expanded state, and the evaporated state. It should be noted that although a theoretical refrigeration cycle has been explained in the description of the aforementioned vapor compression refrigeration cycle, the loss in the compressor 12, the pressure loss of the refrigerant, and the heat loss of the refrigerant need to be taken into account in the actual vapor compression refrigeration cycle 10.

During the operation of the vapor compression refrigeration cycle 10, the refrigerant absorbs vaporization heat from the air in the cabin of the vehicle in vaporizing in the heat exchanger 18 that serves as an evaporator, and cools the interior of the cabin. In addition, the high-pressure liquid refrigerant that has flowed out from the heat exchanger 14 and has been subjected to gas-liquid separation in the gas-liquid separator 40 flows through to the cooling portion 30, and exchanges heat with the HV apparatus 31, thereby cooling the HV apparatus 31. The cooling system 1 cools the HV apparatus 31 as a heat generation source mounted on the vehicle, through the use of the vapor compression refrigeration cycle 10 for air-conditioning in the cabin of the vehicle. It should be noted that the temperature needed to cool the HV apparatus 31 may be a temperature that is at least lower than an upper limit of a temperature range serving as a target temperature range of the HV apparatus 31.

The cooling system 1 cools the HV apparatus 31 through the use of the vapor compression refrigeration cycle 10, which is provided to cool a cooled portion in the heat exchanger 18. Therefore, there is no need to provide an apparatus such as a dedicated water circulation pump, a cooling fan, or the like to cool the HV apparatus 31. Thus, the number of components of the cooling system 1 for the HV apparatus 31 can be reduced, and the configuration of the system can be simplified. Therefore, the cost of manufacturing the cooling system 1 can be reduced. In addition, the cooling system 1 is not required to operate a power source such as a pump, a cooling fan or the like so as to cool the HV apparatus 31, and does not necessitate the power consumption for operating the power source. Accordingly, the power consumption for cooling the HV apparatus 31 can be reduced.

In the heat exchanger 14, the refrigerant may be cooled to be in a wet vapor state. The refrigerant in a gas-liquid mixture state is separated by the gas-liquid separator 40, and only the refrigerant liquid in a saturated liquid state is supplied to the cooling portion 30. The refrigerant in a wet vapor state, which has received evaporative latent heat from the HV apparatus 31 and has partially gasified, is cooled again in the heat exchanger 15. Until the refrigerant in a wet vapor state is condensed to be completely turned into a saturated liquid, the state of the refrigerant changes at a certain temperature. Furthermore, the heat exchanger 15 overcools the liquid-phase refrigerant to an overcool degree that is needed to cool the interior of the cabin of the vehicle. Since there is no need to excessively increase the overcool degree of the refrigerant, it is possible to reduce the capacities of the heat exchangers 14 and 15. Accordingly, it is possible to ensure the cooling capacity for the cabin, and to reduce the size of the heat exchangers 14 and 15. Therefore, the cooling system 1 that is compact and advantageously mountable on a vehicle can be obtained.

The refrigerant passage 23, which forms a part of the route of the refrigerant that flows from the outlet of the heat exchanger 14 toward the inlet of the expansion valve 16, is provided between the heat exchanger 14 and the heat exchanger 15. As a route through which the refrigerant flows from the gas-liquid separator 40 toward the expansion valve 16, the refrigerant passage 23 as a route that does not extend past the cooling portion 30, and the refrigerant passages 34 and 36 and the cooling passage 32 as a route for the refrigerant that flows via the cooling portion 30 to cool the I-IV apparatus 31 are provided in parallel with one another. A cooling system for the HV apparatus 31, which includes the refrigerant passages 34 and 36, is connected in parallel with the refrigerant passage 23. Thus, only a part of the refrigerant that has flowed out from the heat exchanger 14 flows to the cooling portion 30. The refrigerant in an amount that is needed to cool the HV apparatus 31 is caused to flow through to the cooling portion 30, and the HV apparatus 31 is appropriately cooled. Accordingly, the cooling system 1 can prevent the HV apparatus 31 from being overcooled.

The route through which the refrigerant flows from the heat exchanger 14 directly to the heat exchanger 15, and the route through which the refrigerant flows from the heat exchanger 14 to the heat exchanger 15 via the cooling portion 30 are provided in parallel with each other, and only a part of the refrigerant is caused to flow through to the refrigerant passages 34 and 36. Thus, the cooling system 1 can reduce the pressure loss that is caused when the refrigerant flows to the cooling system for the HV apparatus 31. Since not all of the refrigerant flows to the cooling portion 30, the cooling system 1 can reduce the pressure loss regarding the flow of the refrigerant that flows through via the cooling portion 30. In consequence, the electric power consumption needed for the operation of the compressor 12 for causing the refrigerant to circulate can be reduced.

If the low-temperature, low-pressure refrigerant that has passed through the expansion valve 16 is used to cool the HV apparatus 31, the cooling capacity to cool the air in the cabin decreases in the heat exchanger 18, and the cooling capacity for the cabin deteriorates. In contrast, according to the cooling system 1, in the vapor compression refrigeration cycle 10, the high-pressure refrigerant discharged from the compressor 12 is condensed by both the heat exchanger 14 as a first condenser and the heat exchanger 15 as a second condenser. Two-stage heat exchangers, namely, the heat exchangers 14 and 15 are arranged between the compressor 12 and the expansion valve 16. The cooling portion 30 that cools the HV apparatus 31 is provided between the heat exchanger 14 and the heat exchanger 15. The heat exchanger 15 is provided on the route through which the refrigerant flows from the cooling portion 30 toward the expansion valve 16.

The refrigerant that has been heated after receiving evaporative latent heat from the HV apparatus 31 is sufficiently cooled in the heat exchanger 15. Thus, at the outlet of the expansion valve 16, the refrigerant has a temperature and a pressure that are intrinsically needed to cool the interior of the cabin of the vehicle. Thus, in the cooling system 1, it is possible to sufficiently increase the amount of the heat that is received from the outside by the refrigerant at the time of evaporation in the heat exchanger 18. In this manner, in the cooling system 1, the heat radiation capacity of the heat exchanger 15 is determined so as to allow the refrigerant to be sufficiently cooled, and hence the HV apparatus 31 is cooled without influencing the cooling capacity to cool the air in the cabin. Accordingly, the cooling capacity to cool the HV apparatus 31 and the cooling capacity for the cabin can be reliably ensured.

The refrigerant that flows from the heat exchanger 14 to the cooling portion 30 receives heat from the HV apparatus 31 to be heated, in cooling the HV apparatus 31. When the refrigerant is heated to a temperature equal to or higher than a saturated vapor temperature in the cooling portion 30 and the entire refrigerant gasifies, the amount of heat exchange between the refrigerant and the HV apparatus 31 decreases, the HV apparatus 31 cannot be efficiently cooled, and the pressure loss during the flow of the refrigerant in the pipeline increases. Thus, the refrigerant may be sufficiently cooled in the heat exchanger 14 to such an extent that the entire refrigerant does not gasify after cooling the HV apparatus 31.

More specifically, the state of the refrigerant at the outlet of the heat exchanger 14 is made close to a saturated liquid state. Typically, the refrigerant is placed in a state on a saturated liquid line at the outlet of the heat exchanger 14. As described hitherto, the heat exchanger 14 has the capacity to sufficiently cool the refrigerant, so that the heat radiation capacity of the heat exchanger 14 to radiate heat from the refrigerant is higher than the heat radiation capacity of the heat exchanger 15. By sufficiently cooling the refrigerant in the heat exchanger 14 whose heat radiation capacity is relatively high, the cooling system 1 makes it possible to maintain the refrigerant that has received heat from the HV apparatus 31 in a wet vapor state, to prevent the amount of heat exchange between the refrigerant and the HV apparatus 31 from decreasing, and therefore, to sufficiently efficiently cool the HV apparatus 31. After cooling the HV apparatus 31, the refrigerant in a wet vapor state is efficiently cooled again in the heat exchanger 15, and is cooled to be an overcooled liquid whose temperature is lower than a saturation temperature. Accordingly, the cooling system 1 that ensures both the cooling capacity for the cabin and the cooling capacity for the HV apparatus 31 can be provided.

The refrigerant that is in a gas-liquid two-phase state at the outlet of the heat exchanger 14 is separated into a gas phase and a liquid phase in the gas-liquid separator 40. The gas-phase refrigerant separated by the gas-liquid separator 40 flows through via the refrigerant passages 23 and 24 to be directly supplied to the heat exchanger 15. The liquid-phase refrigerant separated by the gas-liquid separator 40 flows through via the refrigerant passage 34, and is supplied to the cooling portion 30 to cool the HV apparatus 31. This liquid-phase refrigerant is a refrigerant in a truly saturated liquid state, which is neither excessive nor insufficient. By taking out only the liquid-phase refrigerant from the gas-liquid separator 40 and causing the liquid-phase refrigerant to flow to the cooling portion 30, the cooling system 1 makes it possible to cool the HV apparatus 31 with the capacity of the heat exchanger 14 utilized to the utmost. Therefore, the cooling system 1 whose cooling capacity to cool the HV apparatus 31 has been enhanced can be provided.

By introducing the refrigerant that is in a saturated liquid state at the outlet of the gas-liquid separator 40 into the cooling passage 32 through which the HV apparatus 31 is cooled, the cooling system 1 can minimize the amount of the refrigerant in a gas phase state, within the refrigerant flowing through the cooling system for the HV apparatus 31 that includes the refrigerant passages 34 and 36 and the cooling passage 32. Thus, the pressure loss can be restrained from increasing due to an increase in the flow velocity of the refrigerant vapors flowing through the cooling system for the HV apparatus 31, and the electric power consumption of the compressor 12 for causing the refrigerant to flow through can be reduced. Therefore, the cooling system 1 can avoid a deterioration in the performance of the vapor compression refrigeration cycle 10.

The refrigerant liquid in a saturated liquid state is retained inside the gas-liquid separator 40. The gas-liquid separator 40 has a function of temporarily retaining therein the refrigerant liquid as a liquid refrigerant. A predetermined amount of the refrigerant liquid is accumulated in the gas-liquid separator 40, so that the cooling system 1 can maintain a certain flow rate of the refrigerant flowing from the gas-liquid separator 40 to the cooling portion 30 even at the time of fluctuations in load. The gas-liquid separator 40 has a liquid retaining function, serves as a buffer for fluctuations in load, and hence can absorb fluctuations in load. Therefore, the cooling system 1 can stabilize the performance of cooling the I-IV apparatus 31.

Referring again to FIG. 1, the cooling system 1 includes the flow rate adjusting valve 28. The flow rate adjusting valve 28 is arranged in the refrigerant passage 23, which forms one of the routes that are connected in parallel with each other among the routes of the refrigerant flowing from the heat exchanger 14 toward the expansion valve 16. The flow rate adjusting valve 28 fluctuates the valve opening degree thereof to increase/reduce the pressure loss of the refrigerant flowing through the refrigerant passage 23, thereby arbitrarily adjusting the flow rate of the refrigerant flowing through the refrigerant passage 23, and the flow rate of the refrigerant flowing through the cooling system for the HV apparatus 31, which includes the cooling passage 32.

For example, when the flow rate adjusting valve 28 is fully closed to make the valve opening degree thereof equal to 0%, the entire refrigerant that has left the heat exchanger 14 flows from the gas-liquid separator 40 into the refrigerant passage 34. When the valve opening degree of the flow rate adjusting valve 28 is increased, the flow rate of the refrigerant that directly flows to the heat exchanger 15 via the refrigerant passage 23 increases, and the flow rate of the refrigerant that flows to the cooling passage 32 via the refrigerant passage 34 to cool the HV apparatus 31 decreases, within the refrigerant that flows from the heat exchanger 14 to the refrigerant passage 22. When the valve opening degree of the flow rate adjusting valve 28 is reduced, the flow rate of the refrigerant that directly flows to the heat exchanger 15 via the refrigerant passage 23 decreases, and the flow rate of the refrigerant that flows via the cooling passage 32 to cool the HV apparatus 31 increases, within the refrigerant that flows from the heat exchanger 14 to the refrigerant passage 22.

When the valve opening degree of the flow rate adjusting valve 28 is increased, the flow rate of the refrigerant that cools the HV apparatus 31 decreases, and the cooling capacity to cool the HV apparatus 31 decreases. When the valve opening degree of the flow rate adjusting valve 28 is reduced, the flow rate of the refrigerant that cools the HV apparatus 31 increases, and the capacity to cool the HV apparatus 31 increases. The amount of the refrigerant flowing to the HV apparatus 31 can be optimally adjusted using the flow rate adjusting valve 28. Therefore, the cooling system 1 can reliably prevent the HV apparatus 31 from being overcooled. In addition, the cooling system 1 can reliably reduce the pressure loss regarding the flow of the refrigerant in the cooling system for the HV apparatus 31, and the electric power consumption of the compressor 12 for causing the refrigerant to circulate.

The cooling system 1 further includes a communication channel 51. The communication channel 51 establishes communication between the refrigerant passage 21 through which the refrigerant flows between the compressor 12 and the heat exchanger 14, and one of the refrigerant passages 34 and 36 through which the refrigerant is caused to flow to the cooling portion 30, more specifically, the refrigerant passage 36 that is located downstream of the cooling portion 30. The refrigerant passage 36 and the communication channel 51 are provided with changeover valves 52 that change communication states between the communication channel 51 and the refrigerant passages 21 and 36. The changeover valves 52 are switched between an open state and a closed state. This makes it possible or impossible for the refrigerant to flow via the communication channel 51. The refrigerant passage 36 is divided into two passages, namely; a refrigerant passage 36a that is located upstream of a branching point between the refrigerant passage 36 and the communication channel 51, and a refrigerant passage 36b that is located downstream of the branching point between the refrigerant passage 36 and the communication channel 51.

By making a changeover in the route of the refrigerant through the use of the changeover valves 52, the cooling system 1 can arbitrarily select one of the routes and cause the refrigerant that has cooled the HV apparatus 31 to flow through to the heat exchanger 15 via the refrigerant passages 36b and 24, or to the heat exchanger 14 via the communication channel 51 and the refrigerant passage 21.

More specifically, two valves 57 and 58 are provided as the changeover valves 52. During cooling operation of the vapor compression refrigeration cycle 10, the valve 57 is fully open (the valve opening degree is 100%) and the valve 58 is fully closed (the valve opening degree is 0%), and the valve opening degree of the flow rate adjusting valve 28 is adjusted such that a sufficient amount of the refrigerant flows to the cooling portion 30. Thus, the cooling system 1 can reliably cause the refrigerant that flows through the refrigerant passage 36a after cooling the HV apparatus 31 to flow through to the heat exchanger 15 via the refrigerant passage 36b. On the other hand, during the stoppage of the vapor compression refrigeration cycle 10, the valve 58 is fully open and the valve 57 is fully closed, and besides, the flow rate adjusting valve 28 is fully closed. Thus, the cooling system 1 can cause the refrigerant that flows through the refrigerant passage 36a after cooling the HV apparatus 31 to flow through to the heat exchanger 14 via the communication channel 51. Thus, an annular route, through which the refrigerant is caused to circulate, is formed between the cooling portion 30 and the heat exchanger 14.

The cooling system 1 further includes a gas accumulator 70 that is connected to the refrigerant passage 36. The gas accumulator 70 is provided in the refrigerant route located downstream of (on the downstream side of) the cooling portion 30. The gas accumulator 70 is arranged between the cooling portion 30 and the branching point between the refrigerant passage 36 and the communication channel 51. That is, the gas accumulator 70 is connected to the refrigerant passage 36a.

The gas accumulator 70 retains therein the gas-phase refrigerant in a saturated vapor state after the refrigerant liquid is gasified through the transfer of heat from the HV apparatus 31 in the cooling portion 30. The high-pressure refrigerant that flows through the refrigerant passage 36 flows into the gas accumulator 70, and the gas accumulator 70 accumulates (retains) refrigerant vapors that have flowed thereinto. When the pressure of the refrigerant that flows through the refrigerant passage 36 falls, the refrigerant vapors in the gas accumulator 70 are discharged from the gas accumulator 70 to the refrigerant passage 36, and thus the flow rate of the refrigerant vapors that flow through the refrigerant passage 36 is restrained from decreasing.

A check valve 79 is arranged between the cooling portion 30 and the gas accumulator 70. The check valve 79 prevents the refrigerant vapors that flow out from the gas accumulator 70 from flowing backward to the cooling portion 30. The check valve 79 is provided such that the refrigerant vapors reliably flow toward the branching point between the communication channel. 51 and the refrigerant passage 36 which is located downstream of the cooling portion 30 instead of flowing toward the cooling portion 30 side, when being discharged from the gas accumulator 70 and flowing to the refrigerant passage 36. The check valve 79 allows the gas-phase refrigerant to flow from the cooling portion 30 toward the gas accumulator 70, and prohibits the gas-phase refrigerant that flows out from the gas accumulator 70 from flowing toward the cooling portion 30.

Figure 3:
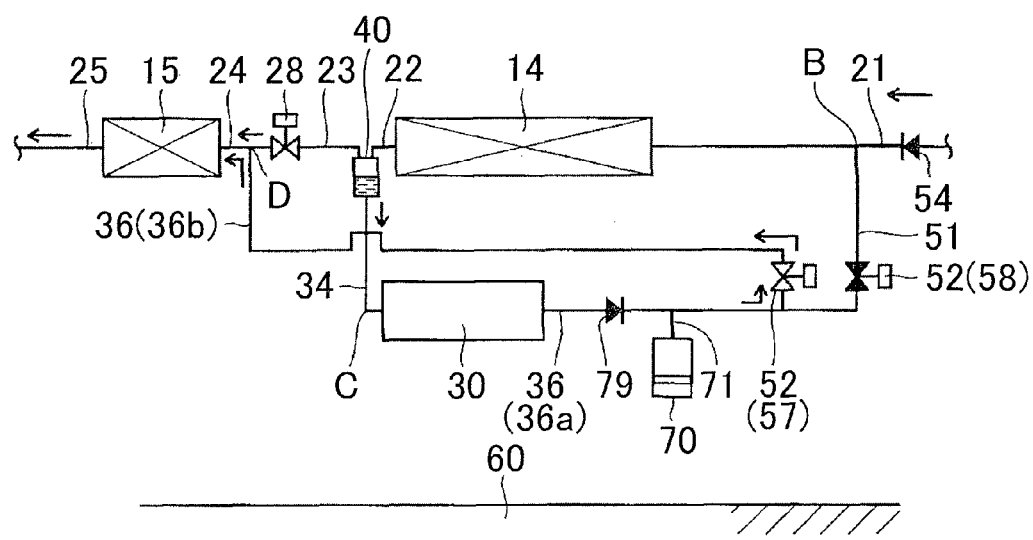
FIG. 3 is a schematic view showing the flow of the refrigerant for cooling an HV apparatus during the operation of the vapor compression refrigeration cycle.

FIG. 3 is a schematic view showing the flow of the refrigerant that cools the HV apparatus 31, during the operation of the vapor compression refrigeration cycle 10. FIG. 3 shows the flow of the refrigerant in the case where the vapor compression refrigeration cycle 10 is operated, namely, in the case where the compressor 12 is operated to cause the refrigerant to flow through the entire vapor compression refrigeration cycle 10.

As shown in FIG. 3, during the operation of an air conditioner, namely, while the compressor 12 is driven to operate the vapor compression refrigeration cycle 10, the valve opening degree of the flow rate adjusting valve 28 is adjusted such that a sufficient amount of the refrigerant flows to the cooling portion 30. The changeover valves 52 are so operated as to cause the refrigerant to flow from the cooling portion 30 to the expansion valve 16 via the heat exchanger 15. That is, by fully opening the valve 57 and fully closing the valve 58, the refrigerant route is selected such that the refrigerant flows through the entire cooling system 1. Thus, the cooling capacity of the vapor compression refrigeration cycle 10 can be ensured, and the HV apparatus 31 can be efficiently cooled.

Figure 4:
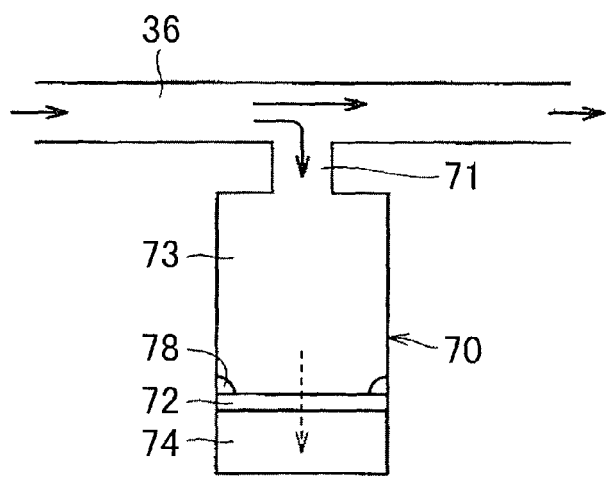
FIG. 4 is an enlarged view showing the details of a gas accumulator shown in FIG. 3.

FIG. 4 is an enlarged view showing the details of the gas accumulator 70 shown in FIG. 3. The gas accumulator 70 and the refrigerant passage 36 are connected to each other via a connection portion 71. The gas-phase refrigerant can flow from the refrigerant passage 36 into the gas accumulator 70 via the connection portion 71. Further, the gas-phase refrigerant can flow out from the gas accumulator 70 to the refrigerant passage 36 via the connection portion 71.

The gas accumulator 70 is formed to be hollow, and a movable partition portion 72 is arranged in the gas accumulator 70. The movable partition portion 72 is freely movable toward or away from the refrigerant passage 36, so as to change the distance from the refrigerant passage 36 to the movable partition portion 72. The movable partition portion 72 divides the inner space of the gas accumulator 70 into a vapor accommodation portion 73 in which refrigerant vapors are accommodated, and a gas encapsulation portion 74 in which a gas is encapsulated. The vapor accommodation portion 73 communicates with the refrigerant passage 36 via the connection portion 71. The gas encapsulation portion 74 is so sealed as to prevent a compressive gas injected thereinto, such as nitrogen or the like, from leaking.

In order to seal the vapor accommodation portion 73, a sealing material 78 is arranged on a peripheral edge portion of a surface of the movable partition portion 72, the surface facing the vapor accommodation portion 73. The sealing material 78 is formed in the shape of, for example, an O-ring made of a rubber material, and prevents the vapor accommodation portion 73 and the gas encapsulation portion 74 from communicating with each other. The sealing material 78 prevents the gas-phase refrigerant from leaking from the vapor accommodation portion 73 to the gas encapsulation portion 74 through a gap between the movable partition portion 72 and the case of the gas accumulator 70, and prevents the gas in the gas encapsulation portion 74 from entering the vapor accommodation portion 73 through the gap between the movable partition portion 72 and the case of the gas accumulator 70.

Due to the movement of the movable partition portion 72 away from the refrigerant passage 36, the volume of the vapor accommodation portion 73 relatively increases, and the volume of the gas encapsulation portion 74 relatively decreases. At this time, the amount of the refrigerant vapors trapped in the vapor accommodation portion 73 has increased, and the internal pressure of the gas encapsulation portion 74 has increased due to the compression of the gas in the gas encapsulation portion 74.

Due to the movement of the movable partition portion 72 toward the refrigerant passage 36, the volume of the vapor accommodation portion 73 relatively decreases, and the volume of the gas encapsulation portion 74 relatively increases. At this time, the amount of the refrigerant vapors accumulated in the vapor accommodation portion 73 has decreased, and the internal pressure of the gas encapsulation portion 74 has decreased due to the expansion of the gas in the gas encapsulation portion 74.

During the operation of the air conditioner shown in FIG. 3, the compressor 12 is in operation, and hence, the refrigerant in a high-pressure saturated vapor state flows through the refrigerant passage 36. Thus, the refrigerant flows through the refrigerant passage 36 in a direction indicated by arrows shown in FIG. 4. At this time, part of the refrigerant flows from the cooling portion 30 to the heat exchanger 15 via the refrigerant passage 36, and the other part of the refrigerant flows from the refrigerant passage 36 into the vapor accommodation portion 73 of the gas accumulator 70, and is retained in the vapor accommodation portion 73.

The compressor 12 raises the pressure of the refrigerant to cause a pressure difference between the refrigerant passage 36 and the interior of the gas accumulator 70, and the gas accumulator 70 can thereby be filled with the refrigerant liquid. Thus, no additional power for causing the refrigerant vapors to flow into the gas accumulator 70 is required. Due to the flow of the high-pressure refrigerant vapors into the vapor accommodation portion 73, a pressure is applied to the movable partition portion 72 by the refrigerant vapors, and the movable partition portion 72 moves away from the refrigerant passage 36 as indicated by a dotted arrow in FIG. 4. Thus, a larger amount of the refrigerant vapors can be retained in the gas accumulator 70.

Figure 5:
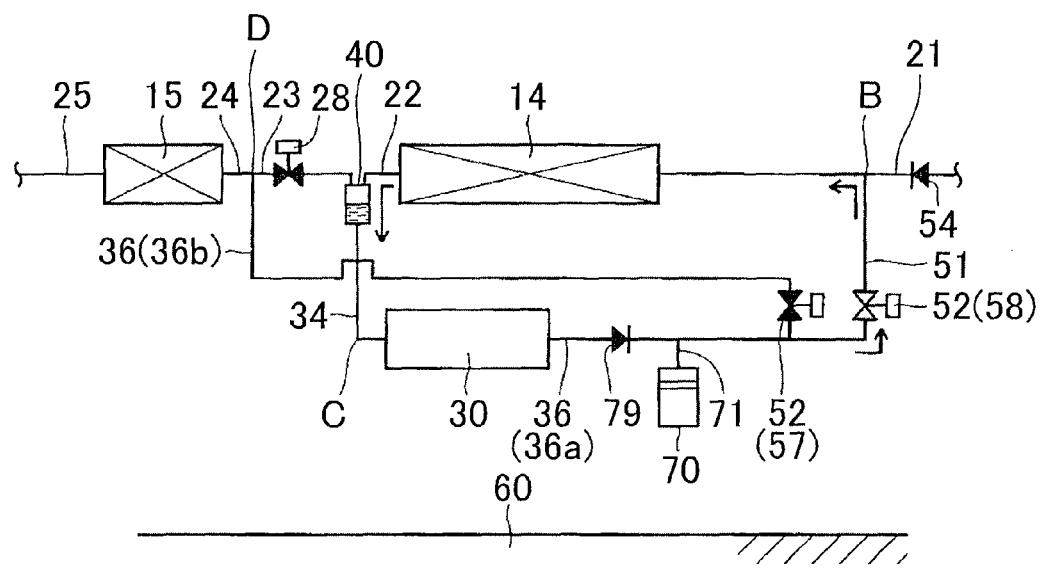
FIG. 5 is a schematic view showing the flow of the refrigerant for cooling the HV apparatus during the stoppage of the vapor compression refrigeration cycle.

FIG. 5 is a schematic view showing the flow of the refrigerant that cools the I-IV apparatus 31, during the stoppage of the vapor compression refrigeration cycle 10. FIG. 5 shows the flow of the refrigerant in the case where the vapor compression refrigeration cycle 10 is stopped, namely, in the case where the compressor 12 is stopped to cause the refrigerant to circulate via an annular route that couples the cooling portion 30 and the heat exchanger 14 to each other.

As shown in FIG. 5, during the operation of a heat pipe, namely, while the compressor 12 is stopped to stop the vapor compression refrigeration cycle 10, the changeover valves 52 are so operated as to cause the refrigerant to circulate from the cooling portion 30 to the heat exchanger 14. That is, by fully closing the valve 57, fully opening the valve 58, and also fully closing the flow rate adjusting valve 28, the refrigerant flows through via the communication channel 51 instead of flowing to the refrigerant passage 36b. By thus setting the opening/closing of the changeover valves 52, a closed annular route is formed. In this closed annular route, the refrigerant flows from the heat exchanger 14, reaches the cooling portion 30 sequentially via the refrigerant passage 22 and the refrigerant passage 34, and then returns to the heat exchanger 14 sequentially via the refrigerant passage 36a, the communication channel 51, and the refrigerant passage 21.

The refrigerant can be caused to circulate between the heat exchanger 14 and the cooling portion 30 via this annular route, without operating the compressor 12. In cooling the HV apparatus 31, the refrigerant receives evaporative latent heat from the HV apparatus 31, and evaporates. The refrigerant vapors gasified by heat exchange with the HV apparatus 31 flow to the heat exchanger 14 sequentially via the refrigerant passage 36a, the communication channel 51, and the refrigerant passage 21. In the heat exchanger 14, the refrigerant vapors are cooled and condense, due to the wind blowing against a vehicle or the ventilation from a radiator fan for cooling the engine. The refrigerant liquid liquefied in the heat exchanger 14 returns to the cooling portion 30 via the refrigerant passages 22 and 34.

Thus, a heat pipe that has the HV apparatus 31 as a heating portion and the heat exchanger 14 as a cooling portion is formed by the annular route that extends through the cooling portion 30 and the heat exchanger 14. Accordingly, when the vapor compression refrigeration cycle 10 is stopped as well, namely, when the vehicle is stopped from being cooled as well, the cooling system 1 is not required to activate the compressor 12, and can reliably cool the HV apparatus 31. Since there is no need to constantly operate the compressor 12 to cool the HV apparatus 31, the cooling system 1 can reduce the power consumption of the compressor 12 to improve the fuel economy of the vehicle, and also, can prolong the life of the compressor 12 and hence enhance the reliability of the compressor 12.

A ground 60 is shown in FIGS. 3 and 5. The cooling portion 30 is arranged below the heat exchanger 14 in a vertical direction that is perpendicular to the ground 60. In the annular route in which the refrigerant is caused to circulate between the heat exchanger 14 and the cooling portion 30, the cooling portion 30 is arranged below, and the heat exchanger 14 is arranged above. The heat exchanger 14 is arranged at a higher position than the position of the cooling portion 30.

In this case, the refrigerant vapors that have been gasified by being heated in the cooling portion 30 ascends in the annular route, reaches the heat exchanger 14, is cooled in the heat exchanger 14, is condensed into the liquid refrigerant, descends in the annular route due to the action of the gravity, and returns to the cooling portion 30. That is, the cooling portion 30, the heat exchanger 14, and the refrigerant route that couples these together form a thermo-syphon heat pipe. The efficiency of heat transfer from the HV apparatus 31 to the heat exchanger 14 can be enhanced by forming the heat pipe. Therefore, even when the vapor compression refrigeration cycle 10 is stopped, the cooling system 1 can more efficiently cool the HV apparatus 31 without applying power.

As the changeover valves 52 that change the communication states between the communication channel 51 and the refrigerant passages 21 and 36, the aforementioned pair of the valves 57 and 58 may be employed, or a three-way valve arranged at the branching point between the refrigerant passage 36 and the communication channel 51 may be employed. In either case, the cooling system 1 can efficiently cool the HV apparatus 31 both during the operation of the vapor compression refrigeration cycle 10 and during the stoppage of the vapor compression refrigeration cycle 10. The valves 57 and 58 are only required to have a simple structure that allows the refrigerant passages to be opened/closed, and are therefore inexpensive. By employing the two valves 57 and 58, the cooling system 1 can be provided at lower cost. On the other hand, the space required for the arrangement of the three-way valve is considered to be smaller than the space required for the arrangement of the two valves 57 and 58. By employing the three-way valve, the cooling system 1 can be provided in smaller size and with higher vehicle mountability.

The cooling system 1 further includes a check valve 54. The check valve 54 is arranged in the refrigerant passage 21 between the compressor 12 and the heat exchanger 14, at a position that is closer to the compressor 12 than a connection point between the refrigerant passage 21 and the communication channel 51. The check valve 54 allows the refrigerant to flow from the compressor 12 toward the heat exchanger 14, and prohibits the refrigerant from flowing in the opposite direction. In this manner, during the operation of the heat pipe shown in FIG. 5, the cooling system 1 can reliably form the closed-loop refrigerant route through which the refrigerant is caused to circulate between the heat exchanger 14 and the cooling portion 30.

In the case where there is no check valve 54, the refrigerant may flow from the communication channel 51 to the refrigerant passage 21 on the compressor 12 side. The cooling system 1 includes the check valve 54, and hence can reliably prohibit the refrigerant from flowing from the communication channel 51 toward the compressor 12 side. Therefore, the cooling capacity to cool the HV apparatus 31 can be prevented from decreasing during the stoppage of the vapor compression refrigeration cycle 10, which employs the heat pipe formed by the annular refrigerant route. Accordingly, even when the cabin of the vehicle is stopped from being cooled, the HV apparatus 31 can be efficiently cooled.

Further, when the amount of the refrigerant in the closed-loop refrigerant route is insufficient during the stoppage of the vapor compression refrigeration cycle 10, the compressor 12 is operated only for a short time, so that the cooling system 1 can supply the refrigerant to the closed-loop route via the check valve 54. Thus, the amount of the refrigerant in the closed loop can be increased, and the amount of heat exchange treatment of the heat pipe can be increased. Accordingly, the cooling system 1 can ensure the amount of the refrigerant in the heat pipe. Therefore, the HV apparatus 31 can be prevented from being insufficiently cooled due to insufficiency in the amount of the refrigerant.

Figure 6:
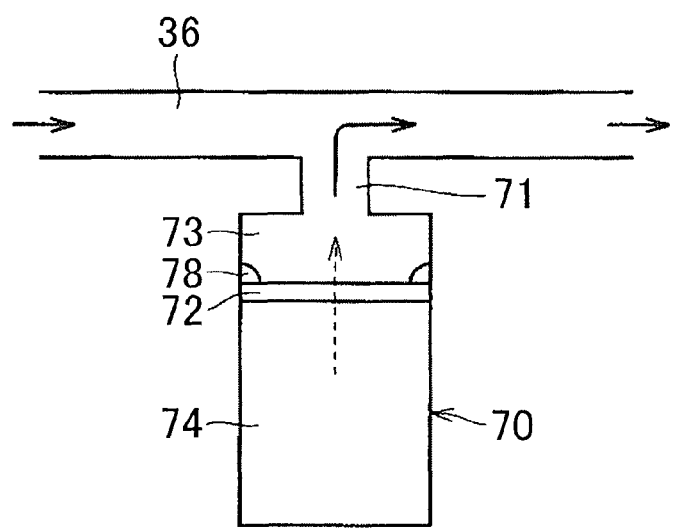
FIG. 6 is an enlarged view showing the details of a gas accumulator shown in FIG. 5.

FIG. 6 is an enlarged view showing the details of the gas accumulator 70 shown in FIG. 5. During the operation of the heat pipe, the compressor 12 is stopped. A driving force that moves the refrigerant in the closed-loop refrigerant route, which forms the thermo-syphon heat pipe, consists only of a gravitational force acting on the liquid refrigerant, and a buoyant force acting on the gaseous refrigerant. The driving force acting on the refrigerant is smaller during the operation of the heat pipe than during the operation of the air conditioner. Thus, there is a concern that a driving force needed to cause the refrigerant to flow through in the closed-loop refrigerant route may not be obtained due to insufficiency in the driving force acting on the refrigerant during the operation of the heat pipe.

In particular, there is a problem in that the performance of cooling the HV apparatus 31 deteriorates due to a time lag that occurs until the cooling of the HV apparatus 31 is resumed upon the start of circulation of the refrigerant immediately after the compressor 12 is stopped to make a changeover from a state where the air conditioner is operated to a state where the heat pipe is operated. The cause for this is considered to be as follows. When the flow rate of the gaseous refrigerant gasified in the closed loop is low, the buoyant force acting on the gaseous refrigerant is small, and therefore, the driving force that is needed to initially move the refrigerant cannot be obtained until the amount of the gaseous refrigerant reaches a certain amount, and the refrigerant hence does not circulate in the closed loop.

In the cooling system 1 according to this embodiment of the invention, the gas accumulator 70 is arranged downstream of the cooling portion 30, and the refrigerant vapors are accumulated in the gas accumulator 70 during the operation of the compressor 12. When a changeover to the operation of the heat pipe is made, the compressor 12 is stopped, and hence the pressure of the refrigerant that flows through the refrigerant passage 36 relatively falls. When the pressure of the refrigerant that flows through the refrigerant passage 36 becomes lower than the pressure of the gas-phase refrigerant retained in the gas accumulator 70, the refrigerant flows out from the vapor accommodation portion 73 of the gas accumulator 70 to the refrigerant passage 36 in a direction indicated, by arrows in FIG. 6. The refrigerant liquid flows out from the gas accumulator 70, and the amount of the refrigerant vapors retained in the vapor accommodation portion 73 decreases, so that the pressure applied to the movable partition portion 72 from the refrigerant vapors falls. Thus, the movable partition portion 72 moves toward the refrigerant passage 36 as indicated by a dotted arrow in FIG. 6.

When the driving force acting on the refrigerant for cooling the HV apparatus 31 as a heat generation source decreases in response to the stoppage of the compressor 12, the refrigerant vapors are discharged from the gas accumulator 70 and caused to flow through to the refrigerant passage 36, so that the flow rate of the gas-phase refrigerant flowing through the closed-loop route is restrained from decreasing. By thus supplementing the refrigerant vapors, the cooling system 1 can ensure a flow rate of the gas-phase refrigerant that flows in the closed-loop refrigerant route, and can ensure a sufficient buoyant force that acts on the gas-phase refrigerant as a driving force for the refrigerant. Thus, the HV apparatus 31 can be stably cooled by restraining the cooling capacity to cool the HV apparatus 31 from decreasing in starting the operation of the heat pipe, and ensuring the performance of cooling the HV apparatus 31. Accordingly, the temperature of the HV apparatus 31 can be effectively restrained from rising.

At this time, since the check valve 79 is provided, the refrigerant that has been force-fed from the gas accumulator 70 to the refrigerant passage 36 can be prevented from flowing backward to the cooling portion 30 side. Accordingly, the gas-phase refrigerant can be reliably delivered from the gas accumulator 70 in a refrigerant flow direction, namely, toward the heat exchanger 14 via the communication channel 51, in the closed-loop route.

While the air conditioner for conditioning the air in the cabin of the vehicle is stopped, the HV apparatus 31 is cooled through the operation of the heat pipe. If the air conditioner is not operated with the gas-phase refrigerant not retained in the gas accumulator 70 in starting to drive the vehicle, the driving force for causing the refrigerant to circulate during the operation of the heat pipe may become insufficient. Thus, when the air conditioner is out of operation and the HV apparatus 31 needs to be cooled from the outset through the operation of the heat pipe, the compressor 12 is operated only for a short time during startup. Due to the operation of this compressor 12, the refrigerant can be delivered into the closed loop, and the gas-phase refrigerant can be retained in the gas accumulator 70. Therefore, the driving force for the refrigerant can be ensured as described above, and the HV apparatus 31 can be stably cooled by ensuring the performance of cooling the HV apparatus 31.

Second Embodiment

Figure 7:
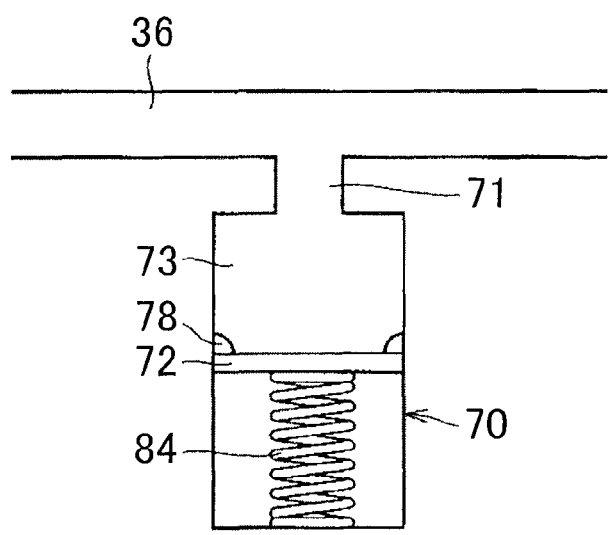
FIG. 7 is a schematic view showing the details of a gas accumulator according to a second embodiment of the invention.

FIG. 7 is a schematic view showing the details of the gas accumulator 70 according to the second embodiment of the invention. In the first embodiment of the invention, the movable partition portion 72 is moved toward the refrigerant passage 36 by the pressure applied to the movable partition portion 72 by the compressive gas with which the gas encapsulation portion 74 is filled. In the second embodiment of the invention, however, an urging member 84 is provided as shown in FIG. 7, instead of encapsulating the compressive gas in the gas encapsulation portion 74. The urging member 84 has one end contacting a surface of the movable partition portion 72 that is located on a side opposite to a side facing the refrigerant passage 36, and the other end contacting an inner wall of the gas accumulator 70 that is located on a side farther from the refrigerant passage 36. The urging member 84 may have any spring shape, such as the shape of a coil spring shown in FIG. 7, or an elastic material such as rubber may be arranged as the urging member 84 in the gas accumulator 70.

Due to the elastic force applied to the movable partition portion 72 by the urging member 84, the movable partition portion 72 is freely movable toward or away from the refrigerant passage 36, so as to change the distance from the refrigerant passage 36 to the movable partition portion 72. Thus, as is the case with the first embodiment of the invention, the cooling system supplies the gas-phase refrigerant from the gas accumulator 70 to the refrigerant passage 36 at the time of changeover to the operation of the heat pipe, and can ensure the flow rate of the refrigerant that flows in the closed-loop refrigerant route. Accordingly, the HV apparatus 31 can be stably cooled by ensuring the performance of cooling the HV apparatus 31.

Third Embodiment

Figure 8:
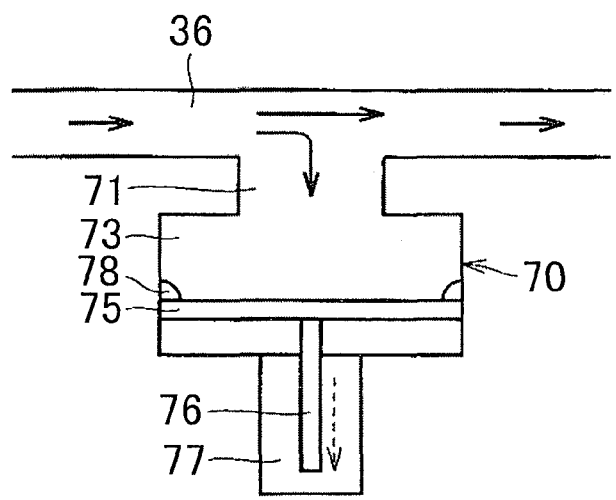
FIG. 8 is a first schematic view showing how a gas-phase refrigerant flows out from/into a gas accumulator according to a third embodiment of the invention.
Figure 9:
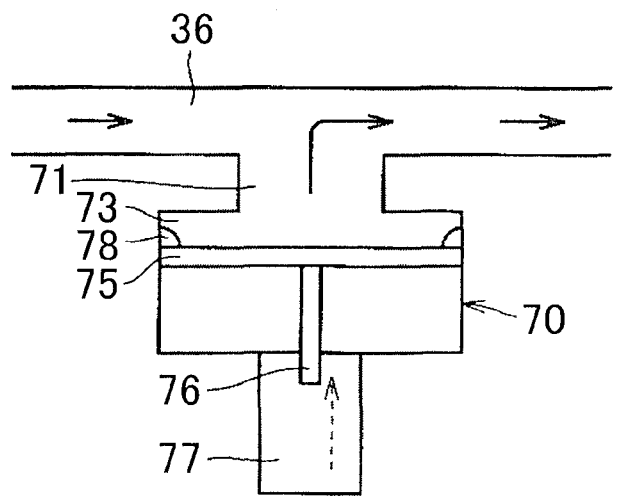
FIG. 9 is a second schematic view showing how the gas-phase refrigerant flows out from/into the gas accumulator according to the third embodiment of the invention.

FIGS. 8 and 9 are schematic views showing how the gas-phase refrigerant flows out from/into a gas accumulator according to the third embodiment of the invention. A cooling system according to the third embodiment of the invention is different from the cooling system according to the first embodiment of the invention in that the cooling system according to the third embodiment includes a drive portion 77 for forcibly driving a movable partition portion 75 arranged in the gas accumulator 70. The cooling system according to the third embodiment of the invention includes the drive portion 77, and therefore, can actively move the refrigerant vapors from the refrigerant passage 36 into the gas accumulator 70, or can actively move the refrigerant vapors from the interior of the gas accumulator 70 to the refrigerant passage 36.

As shown in FIGS. 8 and 9, the movable partition portion 75 increases/reduces the volume of the vapor accommodation portion 73. The drive portion 77 that generates a driving force for driving the movable partition portion 75 is arranged on a side farther from the refrigerant passage 36 with respect to the movable partition portion 75 (i.e., on a side of the movable partition portion 75 opposite from the refrigerant passage 36). It should be noted that although the gas encapsulation portion 74 is designed as a sealed space so as to move the movable partition portion 72 through the internal pressure of the gas with which the gas encapsulation portion 74 is filled in the gas accumulator 70 according to the first embodiment of the invention, there is no need to provide a gas encapsulation portion designed as a sealed space in the third embodiment of the invention, because the movable partition portion 75 is moved by the drive portion 77.

A power transmission shaft 76 extends from the movable partition portion 75 to the drive portion 77. One end of the power transmission shaft 76 is fixed to the movable partition portion 75, and the other end of the power transmission shaft 76 is arranged in the drive portion 77. The power transmission shaft 76 receives a driving force from the drive portion 77 at the other end side thereof, and moves the movable partition portion 75 toward or away from the refrigerant passage 36. The drive portion 77 may electrically drive the movable partition portion 75 via the power transmission shaft 76 by, for example, moving the power transmission shaft 76 through electric energy. The movable partition portion 75, the power transmission shaft 76, and the drive portion 77 may constitute a plunger pump.

For example, by sensing a changeover from the operation of the air conditioner to the operation of the heat pipe, it is determined that the refrigerant vapors need to be supplied to the refrigerant passage 36. At this time, the movable partition portion 75 is moved toward the refrigerant passage 36 by the drive portion 77, and thus, the gas-phase refrigerant is force-fed from the vapor accommodation portion 73 of the gas accumulator 70 to the refrigerant passage 36, and the refrigerant vapors are supplied to the closed-loop refrigerant route. The drive portion 77 functions as a discharge portion that forcibly discharges the refrigerant vapors from the gas accumulator 70 by moving the movable partition portion 75 to reduce the volume of the vapor accommodation portion 73.

In this manner, the cooling system can supply the gas-phase refrigerant to the refrigerant route forming the heat pipe, by forcibly discharging the gas-phase refrigerant from the gas accumulator 70 when making a changeover to the operation of the heat pipe. Therefore, the cooling system can restrain the driving force for the refrigerant from becoming insufficient, and can restrain an inconvenience of the overheat of the HV apparatus 31 from being caused due to a decrease in the cooling capacity to cool the HV apparatus 31.

It should be noted that the cooling system that cools the HV apparatus 31 as an example of an electric apparatus mounted on the vehicle has been described in each of the foregoing embodiments of the invention. The electric apparatus is not limited to the exemplified ones such as an inverter, a motor-generator and the like as long as it can at least generate heat through operation. That is, any electric apparatus may be employed. In the case where there are a plurality of electric apparatuses to be cooled, it is desirable that the plurality of electric apparatuses have a common target cooling temperature range. The target cooling temperature range is a temperature range that is appropriate as a temperature environment in which the electric apparatuses are operated.

Although the embodiments of the invention have been described, the embodiments of the invention disclosed herein are exemplary in all respects, and should be considered to be nonrestrictive. The scope of this invention is not defined by the foregoing description but by the claims. The invention is intended to encompass all the modifications that are equivalent in significance and scope to the claims.

The cooling system according to the invention is especially advantageously applicable to the cooling of an electric apparatus such as a motor-generator, an inverter or the like through the use of a vapor compression refrigeration cycle for cooling the interior of a vehicle such as a hybrid vehicle, a fuel-cell-powered vehicle, an electric vehicle or the like, which is provided with the electric apparatus.

The invention claimed is:

1. A cooling system that cools a heat generation source, comprising:
    a compressor that circulates a refrigerant;
    a first heat exchanger that performs heat exchange between the refrigerant and outside air;
    a pressure reducer that reduces a pressure of the refrigerant;
    a second heat exchanger that performs heat exchange between the refrigerant and air-conditioning air;
    a cooling portion that cools the heat generation source using the refrigerant that flows between the first heat exchanger and the pressure reducer;
    a refrigerant passage through which refrigerant flows;
    a gas accumulator, located downstream from the compressor and upstream from the second heat exchanger, that retains a gas-phase refrigerant gasified by heat exchange with the heat generation source in the cooling portion; and
    a connection portion that connects the gas accumulator to the refrigerant passage,
    wherein the gas accumulator is configured to allow the gas-phase refrigerant to flow from the refrigerant passage into the gas accumulator via the connection portion and be retained in the gas accumulator during operation of the compressor, and to allow the gas-phase refrigerant to flow out from the gas accumulator to the refrigerant passage via the connection portion during stoppage of the compressor, so that the gas-phrase refrigerant must flow through a same location where the connection portion is provided in order to flow into and out from the gas accumulator.

2. The cooling system according to claim 1, further comprising a discharge portion that forcibly discharges the gas-phase refrigerant from the gas accumulator.

3. The cooling system according to claim 1, further comprising
    a check valve that prohibits the gas-phase refrigerant that flows out from the gas accumulator from flowing to the cooling portion.

4. The cooling system according to claim 1, wherein the gas accumulator includes a movable partition portion that divides an inner space of the gas accumulator into a vapor accommodation portion in which the gas-phase refrigerant is accommodated, and a gas encapsulation portion in which a gas is encapsulated.

5. The cooling system according to claim 4, wherein the gas accumulator includes a sealing material that is arranged on a peripheral edge portion of a surface of the movable partition portion, the surface facing the vapor accommodation portion.

6. The cooling system according to claim 1, further comprising
a first passage and a second passage that are connected in parallel with each other in a route of the refrigerant between the first heat exchanger and the pressure reducer, wherein the heat generation source is cooled by the refrigerant that flows through the second passage.

7. The cooling system according to claim 6, further comprising
a third passage through which the refrigerant flows between the compressor and the first heat exchanger, and
a communication channel that establishes communication between the third passage and a side of the second passage, the side being located closer to the pressure reducer than the cooling portion.

8. The cooling system according to claim 7, further comprising
a changeover valve that changes a communication state between the communication channel and the side of the second passage, the side being located closer to the pressure reducer than the cooling portion.

9. The cooling system according to claim 8, wherein the changeover valve causes the refrigerant to flow to the communication channel during stoppage of the compressor.

\* \* \* \* \*